United States Patent [19]

Kite

[11] 4,381,122
[45] Apr. 26, 1983

[54] SAFETY ATTACHMENT FOR A FRONT VEHICLE BUMPER

[75] Inventor: James M. Kite, Rockford, Ill.

[73] Assignee: Auburn Manufacturing Co., Inc., Rockford, Ill.

[21] Appl. No.: 233,621

[22] Filed: Feb. 12, 1981

[51] Int. Cl.³ .......................................... B60R 19/02
[52] U.S. Cl. .................................................. 293/125
[58] Field of Search ............... 293/125, 122, 132, 19, 293/17; 193/37; 308/20

[56] References Cited

U.S. PATENT DOCUMENTS

| 1,104,647 | 7/1914 | Finkelstein | 293/17 |
| 1,556,490 | 10/1925 | Chick | 293/125 |
| 1,626,725 | 2/1925 | Topham | 293/125 |
| 1,774,916 | 9/1930 | Doherty | 293/125 |
| 1,889,174 | 11/1932 | Drexler | 308/20 |
| 2,168,908 | 8/1939 | Lewis | 293/55 |
| 2,935,330 | 5/1960 | Millman | 280/33.99 |
| 3,074,751 | 1/1963 | Gerin | 293/19 |
| 3,708,195 | 1/1973 | Kottsieper | 293/72 |
| 4,068,877 | 1/1978 | Burleson | 293/72 |

FOREIGN PATENT DOCUMENTS

| 1200444 | 6/1958 | France . |
| 470742 | 9/1937 | United Kingdom . |

Primary Examiner—Richard A. Bertsch
Attorney, Agent, or Firm—Leydig, Voit, Osann, Mayer & Holt, Ltd.

[57] ABSTRACT

Two horizontal rollers are rotatably supported on the rear side of a front vehicle bumper adjacent each end portion thereof. If the bumper is shoved rearwardly during a collision, the rollers move into rolling contact with the front wheels of the vehicle to enable the wheels to continue to rotate and to enable the driver to maintain better control over the vehicle.

11 Claims, 4 Drawing Figures

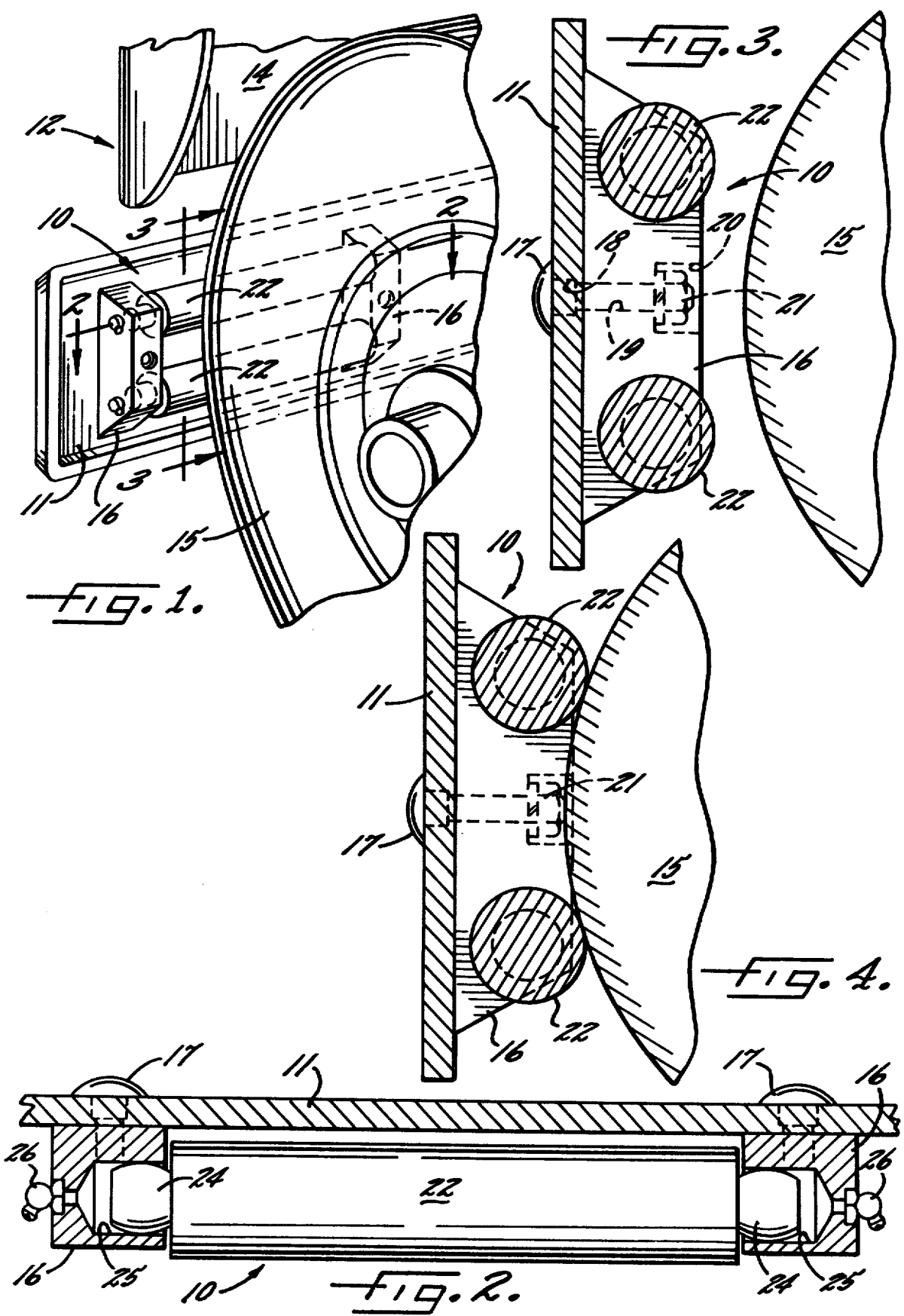

SAFETY ATTACHMENT FOR A FRONT VEHICLE BUMPER

BACKGROUND OF THE INVENTION

This invention relates to an attachment for a vehicle bumper and, more particularly, to an attachment for the front bumper of the tractor of an articulated tractor-trailer rig (ie., a semi).

When such a tractor is involved in a moving collision, the front bumper sometimes is jammed backwardly into the front wheels. Such jamming locks the wheels against rotation, causes the driver to lose steering control, and can result in the trailer jackknifing. To avoid this danger, the owners or drivers of many tractors cut off the end portions of the front bumpers so as to leave the front wheels exposed. This, however, creates a danger in itself by reducing the effectiveness of the bumper in other types of accidents. In addition, the appearance of the tractor is spoiled by the cut-off bumper.

SUMMARY OF THE INVENTION

The general aim of the present invention is to provide a unique front bumper attachment which permits the front wheels to continue to rotate if the bumper is shoved rearwardly toward the wheels during a collision.

A more detailed object is to achieve the foregoing by mounting horizontal rollers, and preferably a pair of vertically spaced rollers, on the rear side of the bumper adjacent each end portion thereof and in front of the wheels. If the bumper is shoved rearwardly, the rollers move into rolling contact with the wheels and permit the wheels to rotate so that the driver has a better chance of maintaining control over the vehicle.

The invention also resides in the relatively simple and yet effective construction of the rollers and of mounting brackets for supporting the rollers.

These and other objects and advantages of the invention will become more apparent from the following detailed description when taken in conjunction with the accompanying drawings.

BRIEF DESCRIPTION OF THE DRAWINGS

FIG. 1 is a fragmentary perspective view of a typical vehicle whose front bumper is equipped with a new and improved safety attachment incorporating the unique features of the present invention.

FIGS. 2 and 3 are enlarged fragmentary cross-sections taken substantially along the lines 2—2 and 3—3, respectively, of FIG. 1.

FIG. 4 is a view similar to FIG. 3 but shows the bumper shoved rearwardly and shows the rollers of the attachment in contact with the wheel of the vehicle.

DETAILED DESCRIPTION OF THE PREFERRED EMBODIMENT

As shown in the drawings for purposes of illustration, the invention is embodied in an attachment 10 for the front bumper 11 of a vehicle 12. The specific vehicle which has been illustrated is the tractor of an articulated tractor-trailer rig. Such a tractor includes a cowl 14 and a pair of laterally spaced and steerable front wheels 15, only one of which has been shown. The bumper is spaced forwardly of the wheels and is attached rigidly to the frame of the tractor 12 in a conventional manner. Opposite end portions of the bumper extend laterally in front of the wheels.

The present invention contemplates the provision of a new and improved front bumper attachment 10 which prevents the bumper 11 from being jammed rearwardly against the wheels 15 and locking the wheels against rotation in the event the bumper is shoved rearwardly during a front end collision. Because of the attachment, the wheels may continue to roll and thus the driver of the tractor 12 is better able to maintain steering control and to prevent a jackknife.

More specifically, one attachment 10 is secured to the rear side of each end portion of the bumper 11 and is located directly in front of the wheel 15. For purposes of simplifying the drawings, only one attachment on one end portion of the bumper has been shown but it will be understood that an identical attachment is identically located and mounted on the other end portion of the bumper.

Herein, the attachment 10 comprises a pair of mounting brackets 16 secured to the rear side of the bumper 11 and spaced laterally from one another such that the brackets are located on opposite sides of the wheel 15. Various means may be used to attach each bracket to the bumper. In the present instance, such means comprise a bolt 17 (FIG. 3) which extends rearwardly through holes 18 and 19 in the bumper and the bracket. The hole 19 is formed with a counterbore 20 which receives a nut 21, the latter being threaded onto the bolt and serving to clamp the bracket tightly to the bumper.

In carrying out the invention, at least one and preferably two substantially horizontal rollers 22 are rotatably supported by each pair of brackets 16. When two rollers are used, they are located in vertically spaced relation on opposite sides of the horizontal diameter of the wheel 15 and are spaced equidistantly from that diameter as shown in FIG. 3.

Advantageously, reduced diameter trunnions 24 (FIG. 2) are formed on the end portions of each roller 22 and are rotatably received in sockets 25 formed in the brackets 16. The trunnions are longitudinally crowned to enable the rollers to swivel to a limited degree within the brackets. Grease fittings 26 are secured to each bracket and communicate with the sockets therein to enable the trunnions to be lubricated.

Normally, the brackets 16 and the rollers 22 are spaced forwardly from the wheel 15 as shown in FIG. 3. If the front of the tractor 12 is involved in a collision, the bumper 11 sometimes is shoved rearwardly toward the wheels. The rollers prevent the rear side of the bumper itself from jamming against the wheels and locking the wheels against rotation. Instead, the rollers are shoved rearwardly into rolling contact with the wheels as shown in FIG. 4. As a result of such rolling contact, the wheels are, in most instances, able to continue to rotate and thus the driver is able to maintain better control of the tractor and hopefully reduce the damage and injury resulting from the collision. When the rollers engage the wheels, the crowned trunnions 24 prevent the rollers from binding against rotation in the event that the rollers are moved into a cocked position relative to the wheels.

From the foregoing, it will be apparent that the present invention brings to the art a new and improved safety attachment 10 for the front bumper 11 of a vehicle and particularly for the bumper of the tractor 12 of an articulated tractor-trailer combination. As a result of the safety feature afforded by the attachment, the owner or operator of the tractor is not likely to cut off the end portions of the bumper as is frequently done with existing bumpers in order to prevent wheel jams. Accordingly, the full intended effectiveness of the bumper may be preserved and, at the same time, the original appearance of the bumper may be maintained.

It is contemplated that the attachment 10 will be retrofitted to the bumpers 11 of existing tractors 12. The rollers 22 may, however, be incorporated as original equipment in new bumpers. If only a single roller is used in front of each wheel 15, it should be located on the horizontal diameter of the wheel. Two rollers are preferred, however, in order to better insure that the bumper itself will not contact the wheel.

I claim:

1. An attachment for a front vehicle bumper having front and rear sides extending transversely of the forward straight line direction of travel of the vehicle, said attachment comprising a pair of transversely spaced brackets, a pair of substantially vertically spaced rollers supported by said brackets to rotate about substantially horizontal axes extending transversely of the forward straight line direction of travel of the vehicle, and means for attaching said brackets to the rear side of the bumper adjacent one end portion thereof.

2. An attachment as defined in claim 1 in which the end portions of each of said rollers are defined by reduced diameter trunnions, and sockets in said brackets and rotatably receiving said trunnions.

3. An attachment as defined in claim 2 in which each of said trunnions is longitudinally crowned.

4. A front transversely extending bumper for a vehicle, said bumper having front and rear sides extending transversely of the forward straight line direction of travel of the vehicle, rollers located on the rear side of the bumper adjacent opposite end portions thereof, and means for supporting each of said rollers on said bumper for rotation about a generally horizontal axis extending transversely of the forward straight line direction of travel of the vehicle.

5. A bumper as defined in claim 4 in which a pair of substantially vertically spaced rollers are supported adjacent each end portion of said bumper.

6. A bumper as defined in either of claims 4 or 5 in which said supporting means comprise transversely spaced brackets attached to the rear side of said bumper, each of said rollers being supported by two of said brackets.

7. A vehicle having first and second laterally spaced and steerable front wheels and having a front bumper spaced forwardly from and extending laterally in front of said wheels, the improvement in said vehicle comprising, first and second pairs of substantially vertically spaced rollers located in front of and spaced forwardly from said first and second wheels, respectively, and means mounting said rollers on the rear side of said bumper for rotation about generally horizontal axes whereby the rollers will make rolling contact with said wheels if said vehicle is involved in a moving collision and said bumper is shoved rearwardly toward said wheels.

8. A vehicle as defined in claim 7 in which said mounting means comprise first and second pairs of laterally spaced brackets fastened to the rear side of said bumper and rotatably receiving the end portions of said first and second pairs of rollers, respectively.

9. A vehicle as defined in claim 8 in which the end portions of each of said rollers are defined by reduced diameter trunnions.

10. A vehicle as defined in claim 9 in which each of said trunnions is longitudinally crowned.

11. A vehicle as defined in claim 7 in which the vertically spaced rollers of each pair are located on opposite sides of the horizontal diameter of the respective wheel and are spaced substantially equidistantly from such diameter.

* * * * *